Feb. 24, 1970   H. A. BACKUS   3,497,282
CARREL UNIT
Filed March 22, 1968   2 Sheets-Sheet 1
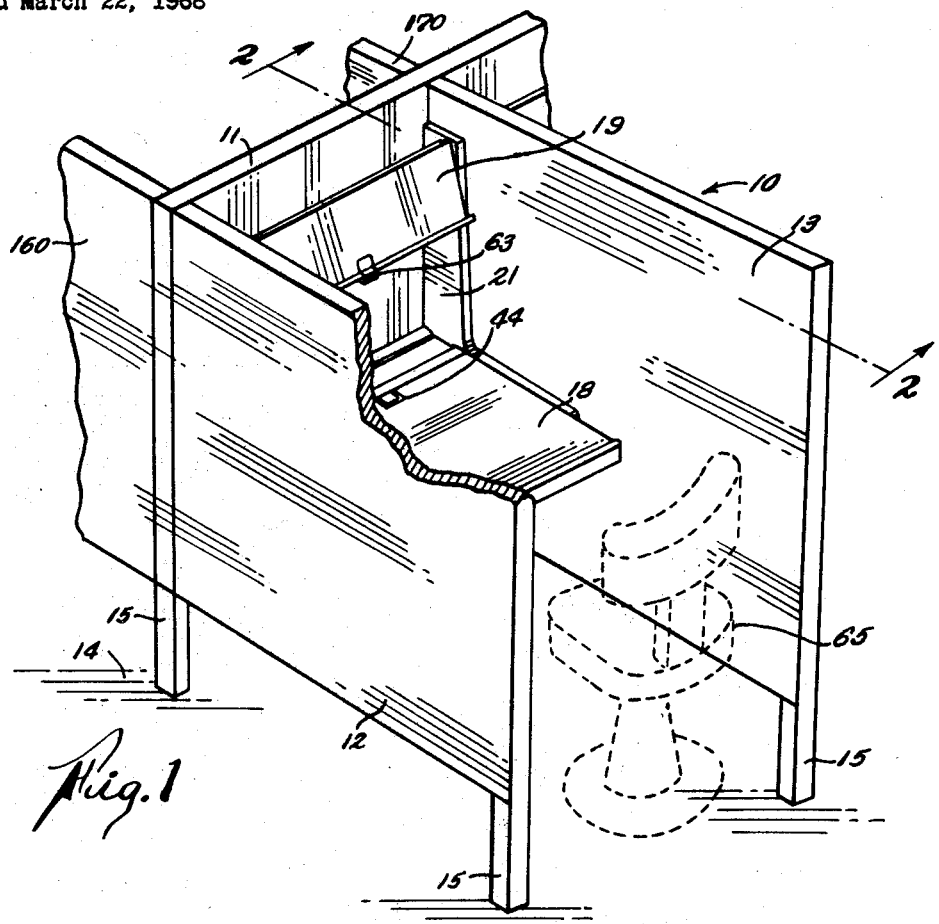
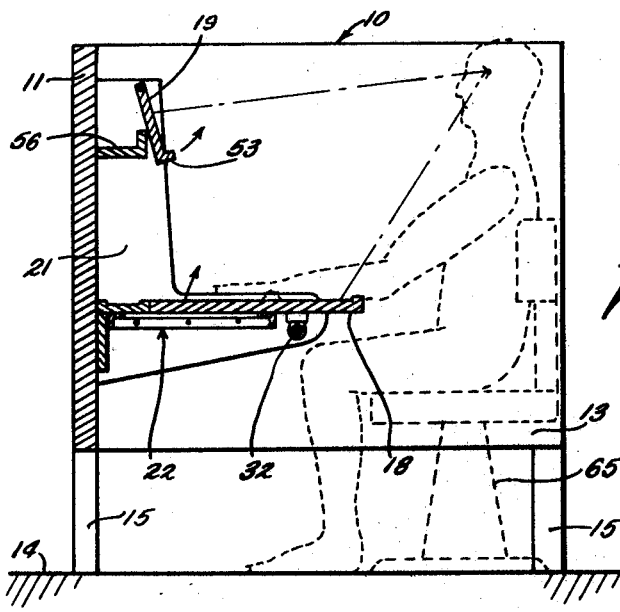
INVENTOR
Harry A. Backus
BY
ATTY.

Feb. 24, 1970　　　　H. A. BACKUS　　　　3,497,282
CARREL UNIT
Filed March 22, 1968　　　　　　　　　2 Sheets-Sheet 2
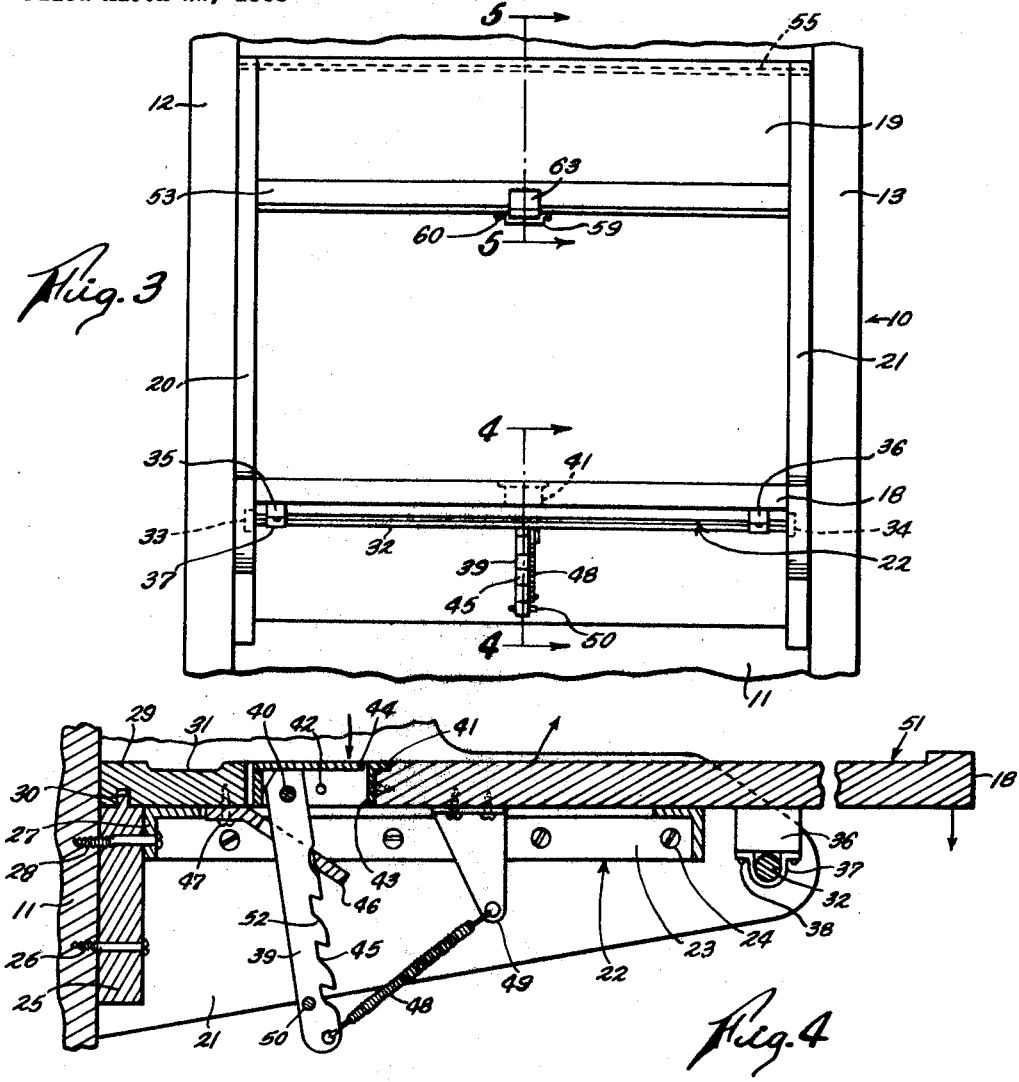
INVENTOR
Harry A. Backus
BY
ATTY.

United States Patent Office 3,497,282
Patented Feb. 24, 1970

3,497,282
CARREL UNIT
Harry A. Backus, c/o The Backus Associates,
370 Neebs Road, Cincinnati, Ohio 45238
Filed Mar. 22, 1968, Ser. No. 715,432
Int. Cl. A47b 41/06, 19/10
U.S. Cl. 312—231                    4 Claims

ABSTRACT OF THE DISCLOSURE

A carrel unit for students which has a stand at eye level adjustably mounted to turn about a horizontal axis into longitudinally inclined reading positions, said unit having a table top adjustably mounted therein to pivot on a horizontal axis into longitudinally inclined writing and/or reading positions.

---

This invention relates to multi-purpose carrel units and is particularly directed to an improved carrel construction that is conducive to the education of students by providing individual, sound-proof enclosures having novel reading and writing facilities so positioned, coordinated and adjustable as to require a minimum of physical effort and consequent distraction to the students employing them.

An object of the invention is to provide a carrel unit susceptible of being assembled singly or in connected groups, each unit having identical facilities contributing to better student education through an improved book stand and writing table assembly.

Another object of the invention is to provide in a carrel unit having the foregoing characteristics an adjustable desk top and an independently adjustable reading stand, on different but convenient levels, which are simple and compact in structure and which afford a means for group arrangement of the carrel units each containing them.

In accordance with the present invention there is provided a multi-purpose carrel unit for students which has a stand for holding reading material such as books, pamphlets, and the like, at eye level when the student is comfortably seated within the carrel before a table top disposed at his normal writing level; the stand being mounted in the unit to turn about a horizontal axis into adjustable, longitudinally inclined reading positions while the table top is pivoted intermediate its ends in the unit on a horizontal axis into adjustable, longitudinally inclined writing or reading positions.

The foregoing and other objects and advantages of this invention will appear from a consideration of the following specification taken together with the accompanying drawings showing one embodiment thereof.

In the drawings:

FIG. 1 is a fragmental, perspective view of my carrel unit, a part thereof being broken away and shown in section.

FIG. 2 is a section taken on line 2—2 of FIG. 1.

FIG. 3 is a front elevational view of the carrel unit shown in FIG. 1, parts thereof being broken away.

FIG. 4 is an enlarged section taken on line 4—4 of FIG. 3.

FIG. 5 is an enlarged section taken on line 5—5 of FIG. 3.

The carrel unit 10 comprises a back panel 11 and opposed side panels 12 and 13, each of said side panels being connected at its rear edge to the back panel in any suitable manner; said back and side panels forming a sound-proof enclosure open at its front end for egress and exit of a student. The upstanding panels are preferably supported in vertical spaced relation from the floor 14 on a plurality of legs 15, it being seen from FIG. 1 that the carrel unit 10 may be constructed singly or assembled in groups by the expedient of connecting additional side panels 160 and 170 to the reverse side of the back panel 11 in parallelism with the side panels 12 and 13, respectively, and by extending the back panel 11 laterally to any distance and connecting further side panels thereto, as required.

Each carrel unit 10 has mounted therein a desk top 18 positioned at a student's normal writing level while assuming a seated position within the unit and a book stand 19 disposed on the student's eye level substantially above the desk top, and to this end a pair of generally L-shaped boards 20 and 21 are connected to the side panels 12 and 13, respectively, in confronting relationship across the rear portion of the carrel unit. As best shown in FIGS. 2 and 4 the back panel, side panels and the mounting boards are reinforced and strengthened by a rigid, rectangular frame member 22 made of reinforced and corner connected angle irons, the side members 23 of said frame being fixed to the side panels and to the boards by screws 24 (FIG. 4). A cross piece 25 is mounted to the back panel 11 by means of screws 26, it being noted that an end member 27 of the frame 22 abuts the upper end of the cross piece 25, the frame and the cross piece being fixed to the back panel by screws 28. The upper end of the cross piece is connected to a horizontal, laterally extending board 29 by means of a tongue and groove joint 30. The upper end of the cross piece has a groove 31 formed therein for holding small objects such as pencils and pens.

The forward ends of the base portions of the L-shaped boards 20 and 21 support between them a cross bar 32 which has its ends secured in bearing discs 33 and 34 (FIG. 3) imbedded and suitably anchored in the said boards 20 and 21, respectively. The table top 18 is pivotally mounted intermediate its front and rear ends on the bar 32 for adjusted, pivoted movement; said table being mounted upon side blocks 35 and 36 which in turn have fixed thereon brackets 37—37 which encircle the bar 32; screws 38 being provided to mount the blocks and the brackets to the underside of the table top 18.

The means securing the table top in adjusted, inclined positions comprises a rack 39 pivoted at its upper end portion on a pin 40, said pin being mounted at its ends in a frame 41 that is fastened by screws 42 in a rectangular opening 43 in the central rear edge portion of the table top 18. A manual push plate 44 is welded to the top edge of the rack 39 and extends across the frame 41 flush with the top edge thereof, the rear part of the plate normally bearing against the frame while the forward portion of the plate is free to move within it when the plate is manually depressed. The rack has a row of saw teeth 45 in its forward edge which individually engage with a pawl 46 fixed to the board 29 by screws 47 to maintain the table top 18 in adjusted, inclined positions. A contractile spring 48 has one end engaged in a bracket 49 fastened to the underside of the table top 18 and has its opposite end fixed to the lower end of the rack 39. A stop pin 50 extends laterally from both sides of the lower end portion of the rack 39 and upon engagement with the pawl 46 determines the limit of inclined motion for the table top 18.

When it is desired to position the table top in a certain inclined position, it is only necessary to bear down on the forward portion 51 (FIG. 4) of the table top 18, such pressure permitting the rack to move upwardly in the pawl against the action of the spring, said movement being made possible by the rounded portions 52 on the upper side of the rack teeth 45 to return the table top to horizontal position the push plate 44 is depressed which action disengages the rack teeth from the pawl thus making the rack and pawl inoperative and allowing free pivotal movement of the table top to its said horizontal position.

The book stand 19 comprises a board having a book supporting ledge 53 along its lower, forward portion, the upper end of the board having a lateral bore 54 formed therethrough for rotatably receiving a cross rod 55 that is anchored at its ends in the upper portions of the upstanding legs of the L-shaped members 20 and 21 of the carrel unit. As best shown in FIG. 5 a book shelf 56 is secured at its ends to the L-shaped members 20 and 21, as by screws, (not shown), said shelf having an upstanding lip 57 fixed to its forward edge. In normal position the book stand board rests against the lip 57 and said board is held in adjusted inclined positions by a rack 58 fixed to a bracket 59 that in turn is secured as by screws 60 to the bottom of the shelf 56. A finger 61 is pivotally mounted on a hinge 62 to the central rear lower portion of the board 19, the forward part of the finger having welded thereto a push button 63 that is freely movable in a notch 64 formed in the lower central portion of the board 19.

The book stand board is adjusted to a desired inclined position by grasping the lower edge of the board and pulling it forwardly into the proper position, the finger 61 falling into a positioning tooth of the rack 58. When it is desired to return the rack to the position indicated in FIG. 5 it is only necessary to push down on the button 63 which releases the finger from the rack and permits free motion of the board to its normal position. It will be noted that the space between the board and the back panel 11 and behind the book stand board 19 may be utilized to hold student's books and writing materials, as required.

In use a student with the required reading and writing materials will enter the carrel from the open side thereof and be seated on a chair 65 within the forward portion of the carrel (FIG. 1). In the seated position, as indicated in FIG. 2, the student's eyes will be on substantially the level of the book stand 19 and his arm and hands will be conveniently positioned for movement upon and in front of the table top 18. By properly and quickly adjusting the book stand 19 and the table top 18 to convenient working positions a student may concentrate on his work with the least physical distraction.

What is claimed is:

1. A multi-purpose carrel unit consisting of a back panel and opposed side panels each corner connected to the back panel, a table top pivotally mounted intermediate its ends on a horizontal hinge disposed within the central portion of the carrel unit and anchored in and extending between the side panels thereof, a book stand pivotally mounted at its upper end to the top rear portion of the carrel unit on a horizontal hinge anchored in and extending between the side panels in a position above the table top, the axes of the hinges for the table top and the book stand lying in an upwardly and rearwardly inclined plane describing an included angle of substantially 60 degrees with the horizontal plane of the unit, said book stand being disposed on a level with a student's eyes while seated within the front portion of the unit and the table top being positioned on a level normal to the student's seated writing position.

2. In a multi-purpose carrel unit as set forth in claim 1 wherein the book stand is pivotally mounted at its upper end on a cross rod anchored at its ends in the opposed side panels, said stand having a lateral bore formed through its upper end portion for rotatably receiving the cross rod.

3. In a multi-purpose carrel unit as set forth in claim 1 wherein a pivot means for adjustably positioning the table top in longitudinally inclined positions is a toothed rack pivotally mounted to the underside of the table top, a rack receiving pawl mounted on the rear portion of the carrel unit, spring means urging the teeth of the rack into engagement with the pawl, and a manual release means connected to the upper end of the rack.

4. In a multi-purpose carrel unit as set forth in claim 1 wherein a pivot means for adjustably positioning the book stand in longitudinally inclined positions is a toothed rack positioned on the carrel unit beneath the stand, a finger pivoted to the stand and gravity operated with its rear end in engagement with the toothed rack, and a manual release means connected to the forward end of the finger.

References Cited

UNITED STATES PATENTS

| | | | |
|---|---|---|---|
| 1,069,879 | 8/1913 | Deeney et al. | 312—231 |
| 1,392,191 | 9/1921 | Menon | 312—235 X |
| 1,416,555 | 5/1922 | Hall | 312—313 |
| 1,996,767 | 4/1935 | Hunter | 312—233 |
| 2,963,332 | 12/1960 | Breuning | 312—231 |
| 3,330,955 | 7/1967 | Barecki et al. | 35—60 X |
| 3,406,645 | 10/1968 | Monroe | 108—23 |

CASMIR A. NUNBERG, Primary Examiner

U.S. Cl. X.R.

35—60; 108—23